May 20, 1958 S. M. CANTOR 2,835,149
MEANS FOR REPAIRING LINOTYPE MATRICES
Filed May 31, 1952 2 Sheets-Sheet 1
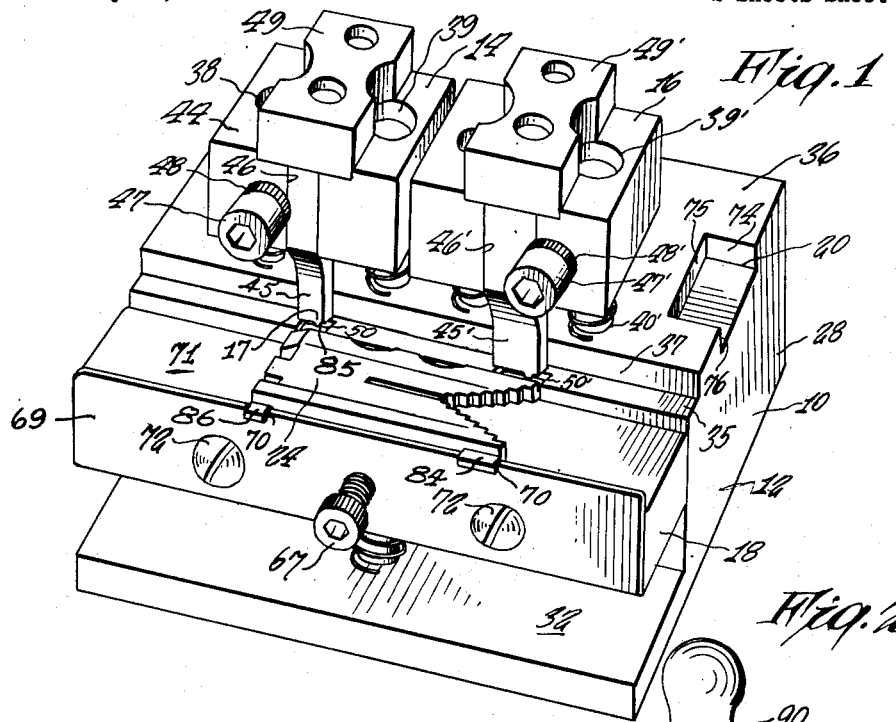
INVENTOR.
Sol M. Cantor May 20, 1958 S. M. CANTOR 2,835,149
MEANS FOR REPAIRING LINOTYPE MATRICES
Filed May 31, 1952 2 Sheets-Sheet 2
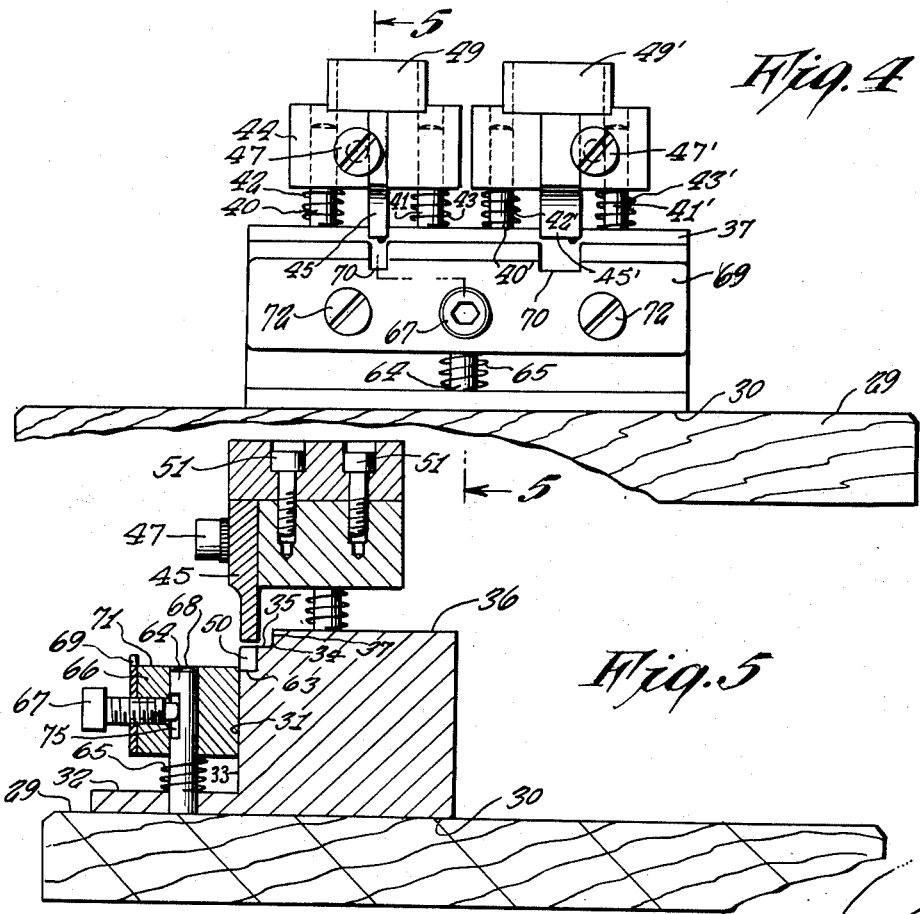
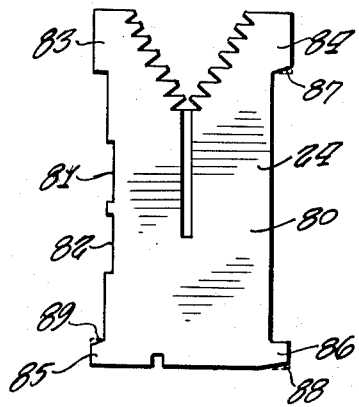
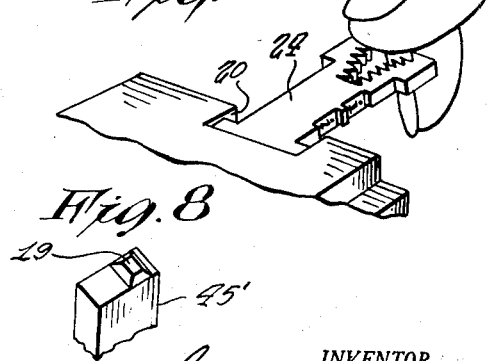
INVENTOR.

United States Patent Office 2,835,149
Patented May 20, 1958

2,835,149

MEANS FOR REPAIRING LINOTYPE MATRICES

Sol M. Cantor, New York, N. Y.

Application May 31, 1952, Serial No. 290,946

2 Claims. (Cl. 78—1)

This invention relates generally to the graphic arts, and more particularly to a means for repairing individual matrices used in linecasting machines which become worn and distorted during continued use. Such machines are referred to in the art as linotype or intertype machines.

In the forming of slugs which are used for the printing of newspapers and other printed matter, type is set almost universally by means of a linecasting machine in which a large number of matrices are assembled to form a line of type against which molten type metal is forced in a mold under pressure to take an impression of said matrices. When the same has been completed, the matrices are withdrawn from the now solidified metal to be returned to individual boxes or slots for re-use. With the passage of time and continued use, certain sections of the individual matrices of the letters of the alphabet most commonly used, which serve to provide means for aligning the same, become worn; so that continued use results in printing lines in which certain of the letters comprising individual words are disposed at a level higher or lower than that of the remaining letters. The surfaces which become worn may differ as little as .002 inch from true and yet result in faulty alignment. When this condition occurs it has been common practice to discard the matrices, replacing them with new matrices. This procedure has been relatively expensive and wasteful, since the matrices if not otherwise seriously damaged may by recourse to the present invention be repaired several times before it is necessary to scrap them.

It is therefore among the principal objects of the present invention to provide a means for repairing the worn matrices so that they may be expediently and conveniently returned to their original condition when repair is necessary.

Another object of the invention lies in the provision of means whereby the above mentioned repair is accomplished by extrusion of portions of the relatively soft metal from which the matrices are formed.

Another object of the invention lies in the provision of means as described in which the cost of fabrication of the device may be of a relatively low order, with consequent wide sale, distribution and use throughout the art.

Another object of the invention lies in the provision of repair means having simple construction, thus providing a relatively long trouble-free operational life.

A feature of the invention lies in the fact that all of the worn surfaces of an individual matrix may be repaired with a minimum of movement and adjustment on the part of the operator of the device, thus facilitating the repair of a large number of matrices in a comparatively short period of time.

Another feature of the invention lies in the fact that the restored surfaces may be quickly gauged for proper tolerances, and when the same have been exceeded, reduced to the proper tolerances with a minimum of additional effort on the part of the operator of the device.

These objects and features, as well as other incidental ends and advantages, will become more clearly apparent during the course of the following disclosure, and be pointed out in the appended claims.

On the drawings, to which reference will be made in the specification, similar reference characters have been employed to designate corresponding parts throughout the several views.

Figure 1 is a view in perspective showing an embodiment of the invention.

Figure 2 is a fragmentary enlarged view in perspective corresponding to the upper right hand portion of Figure 1, and showing a stage of the restoring operation on a matrix.

Figure 3 is an enlarged fragmentary view in perspective corresponding to the left hand portion of Figure 1 and showing a matrix positioned for a second stage of the restoring operation.

Figure 4 is a fragmentary front elevational view of the embodiment showing the same positioned upon a base board.

Figure 5 is a fragmentary vertical sectional view as seen from the plane 5—5 on Figure 4.

Figure 6 is a fragmentary view in perspective showing gauging of the matrix after repairing.

Figure 7 is a plan view showing a conventional matrix of a type adapted for use with the device. In this view, the matrix is shown in a worn condition, the restored condition being indicated by dot and dash lines.

Figure 8 is a fragmentary view in perspective of die member 45'.

In accordance with the invention, the device, generally indicated by reference character 10, comprises broadly: a base element 12, a first die element 14, a second die element 16, an adjustable support element 18, and a gauge element 20. A standard, widely used, linecasting matrix is indicated by reference character 24, and it is to be understood that this particular type of matrix is shown by way of example only, since the scope of the invention has application to a wide variety of similar types of matrices.

The base element 12 includes a base member 29 (Figure 4), which is formed from a suitable durable material such as wood. If desired, the device 10 may be mounted directly upon the surface of a table or workbench, the base member 29 being omitted. The base element 12 also includes a portion 28 which may be of metal and which may be cast to the desired shape and configuration, or may be machined from a solid block of metallic material. It includes a lower surface 30 which is adapted to rest upon the base member 29 when used. A large rabbet portion 31 is provided to accommodate the support element 18, which rabbet portion includes a horizontally disposed surface 32 as well as a vertically disposed surface 33 (Figure 5). A smaller rabbet portion 34, including the horizontally disposed surface 35 and the vertically disposed surface 37 is also provided at the forward portion of the element 12 to facilitate the positioning of matrices 24 during the restoring operation. The upper surface 36 of the element 12 is substantially planar and parallel to the lower surface 30.

The first die element 14 is mounted above the upper surface 36 of the element 12 and is adapted for vertical reciprocation with respect thereto. To achieve this end there is provided a pair of cylindrically shaped supports 40 and 41 about which are positioned coil springs 42 and 43 respectively (Figure 4). The die block 44 is provided with cylindrically shaped bores 38 and 39 into which the supports 40 and 41 are positioned. The springs 42 and 43 are of such modulus as to reach equilibrium when the block 44 is positioned as shown on Figure 1 wherein the die member 45 may clear the horizontally disposed surface 35 of the rabbet 34, thus facilitating the positioning and removal of the matrices 24 as desired. The die member 45 is removable for replacement, when needed, and is normally maintained within an elongated slot 46 by a set screw 47 and lock washer 48 which bears against a portion of the same. Mounted upon the upper surface of the block 44 is an impact plate 49 which is maintained in position by screws 55 (Figure 5). The plate 49 is preferably of hardened steel adapted to withstand the impact of hammer blows without becoming unduly deformed therefrom.

The second die element 16 is similar in most respects to the first die element 14, and consequently, to avoid needless repetition, certain of the parts corresponding to those of the first die element have been designated by similar reference characters with the additional suffix prime "'." The second die element 16 differs from the first die element 14 principally in the dimensions of the die member 45' and slot 46' in which it is disposed, these being of somewhat greater width to accommodate for the configurations of the matrix being repaired.

The support element 18 is adjustably mounted upon the base element 12 and serves to support and position the main body portion 80 of an individual matrix 24. It includes a cylindrical support member 64 (Figure 4) about which there is positioned a spring 65 which serves to urge the support block 66 in an upwardly direction. The vertical path of travel of the block 66 is governed by an adjustment screw 67 which rides in a groove in the member 64 (Figure 5). The front plate 69 is secured to the outwardly disposed vertical surface of the block 66 by means of screws 72 and extends above the upper surface 71 thereof so as to properly position a matrix. Cut out portions 70 (Figure 4) are provided to receive the aligning projections of the matrix. As seen in Figure 2, the support element 18 is normally adjusted so that the upper surface 71 of the block 66 is coincident with the lower surface 63 of the die channels 50 and 50', although when the matrices have been bent or damaged other positions will be required in order that the same may be straightened by the die members 45 and 45' as well as extruded.

The operation of the device will be apparent from a perusal of the drawings, although it is believed that a short description will be helpful. Referring to Figure 7 there may be seen a standard linecasting matrix 24 which is normally formed from brass or other soft ductile metallic material. The matrix 24 includes a main body portion 80 having typesetting faces 81 and 82. These matrices are aligned with other similar elements to form a line of type against which molten type metal is pressed. The alignment is accomplished by means of a pair of upper aligning projections 83 and 84 and a pair of lower aligning projections 85 and 86. It has been found from experience that the points of wear which result in misaligned type are those indicated by reference characters 87, 88 and 89. These surfaces need only wear as little as .001 or .002 inch, to result in an undesirable disalignment of the characters in a printed line. Thus the restoration of these effective surface limits requires only a small amount of extrusion of the material of which the matrix is composed, the addition of extra material or metal being unnecessary.

The matrices of the linotype or intertype design are aligned in the Roman position thereof by two lugs, the aligning projections 85 (the lower lug or toe on the casting side of the matrix), and 84 (the upper ear on the index side of the matrix). The projection 85 wears the most while the projection 84 seldom requires repairing.

To repair the projection 85, a matrix 24 is placed upon the surface 71 with the projections 85 and 83 disposed within the die channels 50 and 50' respectively. Normally the height of the platform or surface 71 is such as to accommodate the matrices which are most in use. The upper limit of travel of the surface 71 may be controlled by having the inner end of the adjustment screw 67 contact the upper limit of the groove 75. When set at the proper height, the surface 71 supports the matrix so that the projections 85 and 83 are level and flat upon the surfaces 63 (only one of which is seen in Figure 5 and they lie behind the cut out portions 70 in Figure 4). In the case of 14 point, 18 point, or larger matrices on which the aligning projections are routed on both sides, the set screw 67 is loosened and the surface 71 is lowered against the action of the spring 65, and then tightened. Parts will now appear as shown in Figure 1. Following this, the impact plate 49 is struck as by the hammer 90. The more the matrix is worn, the harder will be the blow required. Because of the extruding projection 17 which is eccentrically disposed in the direction of greatest distortion, the metal of the projection 85 will be caused to flow so that the surface 89 (Fig. 7) will be brought back to its original position. The matrix may now be manually lifted and a small amount of resistance should be felt as it is lifted out. If the matrix lifts too freely, additional hammering on the plate 49 is required.

The projection 84 (the upper ear on the index side) is repaired by placing the matrix 24 on the device 10 in the position it occupies in Figure 2. Following this, the hammer is used to strike the impact plate 49'. The extruding projection 19 on the lower end of the die member 45' acts similarly to the projection 17 previously described and spreads the metal to restore the original exterior dimension of the surface 87, which is determined by the size and position of the channel 50'.

The alignment of italic, small capitals, and bold face type is controlled by the projection 85 (the lower lug on the casting side) and the surface 88 on the projection 86 (the bottom of the lower lug on the index side. The surface 88 requires repair when rounded on the bottom, since this is the part of the matrix which comes into contact with the duplex rail of the first elevator in the casting machine (not shown). In order to make this repair, the matrix is positioned as shown in Figure 3, where the action is similar to that described in connection with Figure 1, execpt that now the surface 88 is restored.

After the projections 84, 85, and 86 have been thus restored, there may be excess distortion thereof, laterally outward, as viewed in Figure 7. This is determined by placing each large end of the matrix into the gauge element 20, as shown in Figure 6. If the matrix doesn't fit in, it may be dressed down until it does by a fine file (not shown).

Because of the shape of the extruding projection (Figure 8), metal is caused to flow not only in the direction of the edge being repaired as described hereinabove, but also laterally as viewed on Figure 7 which is desirable in the case of badly worn aligning projections.

I wish it to be understood that I do not desire to be limited to the exact details of construction shown and described for obvious modifications will occur to a person skilled in the art to which the present invention relates.

I claim:

1. A device for repairing linotype matrices, the matrices having a main body and an aligning projection normally lying within the plane of said main body, said device comprising: a base element having an upwardly disposed surface including cut-out portions forming die channels adapted to receive said aligning projection, a support element adjustably mounted upon said base element, said support element having a horizontally disposed surface and means for adjusting the plane of said surface with respect to said die channels, said surface being adapted to support said main body of said matrices, a die element mounted for substantially vertical reciprocation upon said base element; whereby upon adjusting said surface of said support member with respect to said cut-out portions, said aligning projections may be enlarged by said die members without bending the same out of the plane of said main body.

2. A device for repairing linotype matrices, said matrices having a main body and a plurality of aligning projections normally lying within the plane of said main body, said device comprising: a base element having an upwardly disposed surface including cutout portions forming die channels adapted to receive said aligning projections, a support element adjustably mounted upon said base element, said support element having a horizontally disposed surface, and means for adjusting the plane of said surface with respect to said cutout portions, said surface being adapted to support said main body of said matrices; a plurality of die elements mounted for substantially vertical reciprocation upon said base element; whereby upon adjusting said surface of said support element with respect to said cutout portions, said aligning projection may be enlarged by said die member without bending the same out of the plane of said main body.

References Cited in the file of this patent

UNITED STATES PATENTS

| | | |
|---|---|---|
| 45,187 | Spaulding | Nov. 22, 1864 |
| 1,153,391 | Hughes | Sept. 14, 1915 |
| 1,466,844 | McGuckin | Sept. 4, 1923 |
| 2,169,346 | Lloyd | Aug. 16, 1939 |
| 2,219,631 | Milberg | Oct. 29, 1940 |